United States Patent [19]

King

[11] Patent Number: 5,129,481
[45] Date of Patent: Jul. 14, 1992

[54] APPARATUS AND METHOD FOR LUBRICATING CONVEYORS

[75] Inventor: William J. King, Orange, Calif.

[73] Assignee: Pure-Chem Products Company, Inc., Stanton, Calif.

[21] Appl. No.: 827,468

[22] Filed: Jan. 29, 1992

[51] Int. Cl.$^5$ .............................................. F16N 7/24
[52] U.S. Cl. ............................ 184/15.3; 137/624.13
[58] Field of Search ............... 184/15.1, 15.2, 15.3, 184/37, 39, 39.1, 7.4; 137/596.17, 624.13, 624.18; 104/279; 198/500

[56] References Cited

U.S. PATENT DOCUMENTS

| | | | |
|---|---|---|---|
| 2,527,136 | 10/1950 | Kagi et al. | 137/624.13 |
| 2,920,720 | 1/1960 | Hemsley | 184/15.2 |
| 3,503,470 | 3/1970 | Lister | 184/15.1 |
| 4,159,046 | 6/1979 | Frost et al. | 184/15.2 |
| 4,679,659 | 6/1987 | Jendick | 184/15.2 |
| 4,844,203 | 7/1989 | Brown et al. | 184/15.3 |

Primary Examiner—Allen M. Ostrager
Assistant Examiner—Alan B. Cariaso
Attorney, Agent, or Firm—Willie Krawitz

[57] ABSTRACT

An apparatus and method for lubricating conveyors and belts used in the food industry is disclosed, comprising a device including valves which are alternately opened and closed by an actuating device driven from the conveyor movement. The valves supply a lubricant which is fed to output nozzles for spraying onto the conveyors for lubricating purposes, and the valves will only feed lubricant when the conveyor is moving. Consequently, lubricant and water wastage are significantly decreased, along with excess sewage charges, and the need for a conventional electrically driven solenoid system for controlling the output of lubricant is eliminated.

5 Claims, 1 Drawing Sheet

APPARATUS AND METHOD FOR LUBRICATING CONVEYORS

BACKGROUND OF THE INVENTION

This invention relates to a new and improved apparatus and method for lubricating conveyors commonly used in the food processing and packaging industry. Typically, conveyors contemplated by this invention are employed in food canning and soft drink manufacturing facilities, breweries, and packaging facilities, dairies, etc.

Conveyors employed in some of the large facilities noted above are generally very long, and some can extend for as much as several hundred feet; the conveyor components themselves are also very heavy. If they are not lubricated, the conveyors will become excessively worn and ultimately break. If this occurs, because conveyors can operate with heavy loading and high tension, chain breakage is extremely dangerous. As a result, the industry practice is to over-lubricate these conveyors, which is not only expensive, but also lubricant foam is produced, and this causes a slippery condition that is dangerous to personnel.

It would be preferred to eliminate lubricating a conveyor when a particular section of a conveyor system is shut down, either temporarily during a run, or for longer periods of time, say during a shift change, during repairs, and during routine maintenance, etc. This would result in savings of lubricant and water, and sewage charges due to excessive use.

Presently, the industry uses electrically actuated stop-start solenoids to control lubrication and prevent unnecessary lubrication of the conveyors during a shut down, and a large plant might employ, say about one hundred solenoids. However, the capital and installation costs of an electrical solenoid system are high, and maintenance and operating costs will be incurred if moisture enters the electrical component parts of the solenoid and causes electrical breakdowns.

Hence, a device is desired for applying lubricant to a conveyor which does not require electrical actuation, is easily installed and serviced, is inexpensive, and will stop and start automatically along with the conveyor motion.

THE INVENTION

According to the invention, there is provided a device and method of applying a lubricant to a conveyor for use in the food and packaging industry, comprising two valves having an outlet through which the lubricant is applied to the conveyor. A rotary actuated device is driven from the conveyor and will actuate the valves in opposite sequence so that when the inlet valve is 'on', the outlet will be 'off', and vice versa. Consequently, when the conveyor movement is stopped, the application of lubricant will cease.

In addition, by varying the outlet size and feed line diameters, the amount of lubricant being applied can be reduced without endangering personnel due to the possibility of chain breakage, and lost production time due to the repair and/or replacement of a conveyor. Also, the reduction of excess lubricant foam is reduced, and this reduces the possibility of injuries due to the presence of slippery conditions, as well as product contamination.

Moreover, the use of a mechanical system which is non electrical, rather than using an electrical solenoid stop-start system for applying lubricant to a moving conveyor, eliminates the possibility of electrical failures caused when moisture contacts the electrical components of the solenoid. Hence, the potential down-time of a production line or of the entire plant is reduced.

Use of a conveyor movement which actuates an on-off control system functions as a demand signal, and provides an effective means of assisting in controlling the requisite amount of lubricant applied to the conveyor.

DESCRIPTION OF THE PREFERRED EMBODIMENTS

Figure 1:
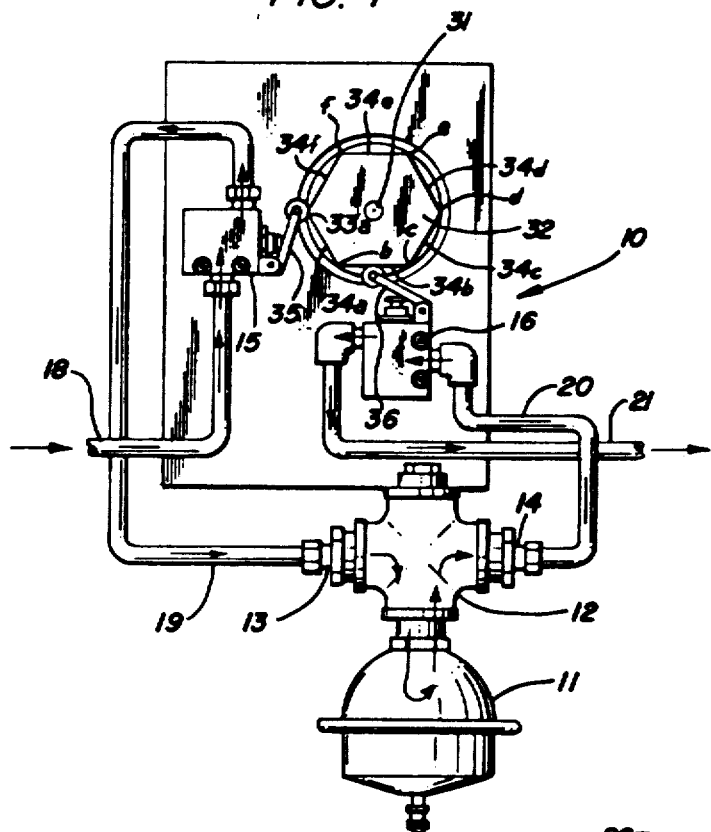
FIG. 1 is an external, side elevation view of the valve system of this invention installed for use in feeding lubricant to a conveyor.

The on-off control system 10 of this invention is shown in FIG. 1, and comprises a bladder accumulator 11, and a suitable type is sold by Watts Regulator Company as No. 150A. A connecting pipe fitting 12 is threaded onto the accumulator, and the pipe fitting provides inlet and outlet ports 13, 14 respectively. Inlet and outlet valves 15 and 16 are mounted on a support plate 17 and an inlet supply line 18 supplies lubricant to the inlet valve 15. Suitable inlet and outlet valves are sold by Humphrey Products Company as Model 31P.

Figure 3:
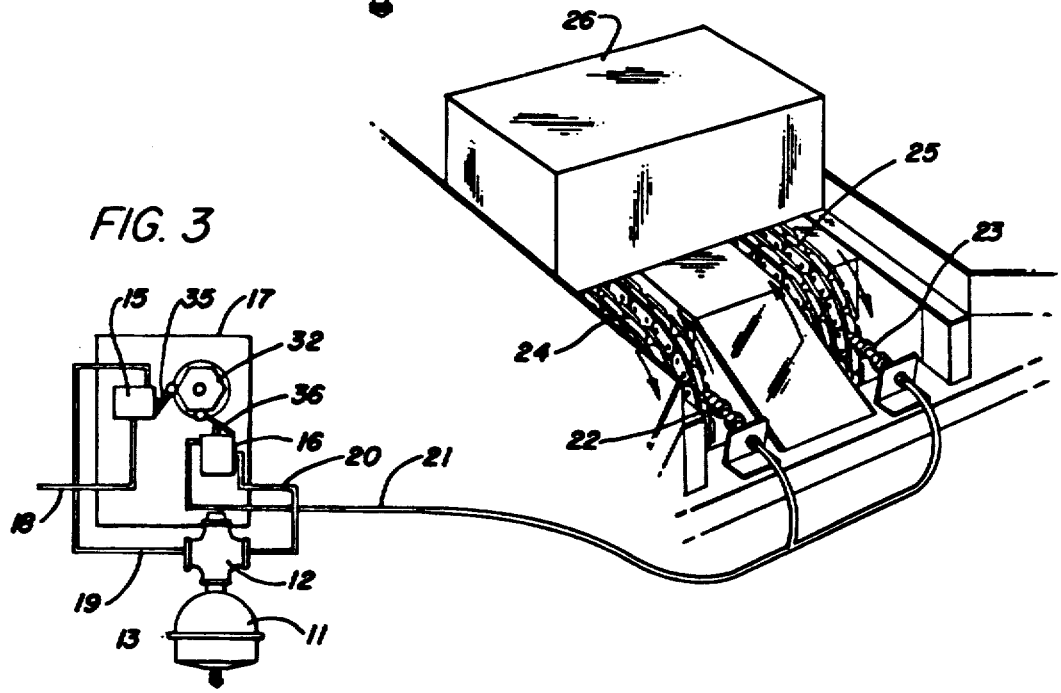

A line 19 from the inlet valve 15 connects to the inlet port 13 of the pipe fitting 12, and feeds lubricant to the accumulator 11; an outlet line 20 from the fitting 12 leads to the outlet valve 16. As shown in FIG. 3, a nozzle feed line 21 connects from the outlet valve 16 to supply spray nozzles 22 and 23 with lubricant, and suitable spray nozzles for this purpose are described in Applicant's U.S. Pat. No. 5,033,676, and Ser. No. 712,597 filed Jun. 10, 1991.

Lubricant from the nozzles 22 and 23 is applied to a moving conveyors 24 and 25 and a case 26 is shown being placed on conveyor 25 for movement therealong.

A conveyor motor (not shown) having a central drive shaft 31 is employed to move the chain drives 24 and 25, and a cam 32 is mounted on the end of the drive shaft 31 and positioned through the support plate 17. The cam is hexagonally shaped and defines corners 33a-33f and sides 34a-34f. The corners are sized to contact and actuate, in alternate sequence, spring loaded actuating arms 35 and 36 mounted on the inlet and outlet valves 15 and 16, respectively.

Figure 2:
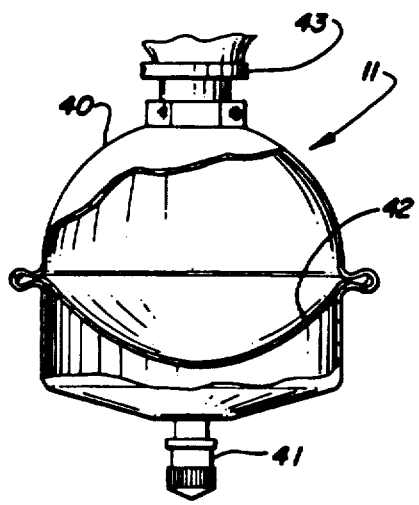
FIG. 2 is a cross sectional view, in side elevation of a flow interval modulator suitable for use in conjunction with the dual valve device of this invention; and, FIG. 3 is a schematic view of the on-off control system of this invention employed in conjunction with spray nozzles for feeding lubricant to a conveyor.

The accumulator 11 is shown in greater detail in FIG. 2, and a suitable type is sold by Watts Regulator Company as Model No. 150A. The accumulator 11 provides an outer steel body 40 which may be coated with plastic to prevent rust. An air-tight sealing cap 41 is provided and includes a standard tire valve under the cap (not shown) to facilitate charging. The inside of the accumulator provides a permanently precharged air chamber and a molded, sealed-in diaphragm 42 which flexes to absorb and/or transmit shock or surges. A brass adaptor 43 which is mounted on the accumulator 11 enables a connection to be made with the pipe fitting 12.

When actuating arm 35 is compressed, valve 15 will open and lubricant will be passed from the supply line 18, through inlet valve 15 and line 19 into the pipe fitting 12 and accumulator 11. The pressure of line 19 will be maintained in outlet line 20 by the accumulator 11. During this sequence, valve 16 will be turned off, to prevent lubricant from being fed from the accumulator to the nozzles 22 and 23.

When cam 32 advances one sixth (1/6) of a turn, actuating arm 36 will contact corner 33b and be compressed against its spring loading. Simultaneously, actuating arm 35 will be released from compression, since it is no longer in contact with a corner of the cam, and therefore valve 15 will close. The compression of actuating arm 36 will open valve 16 and open line 20 through line 21 from the accumulator to the nozzles 22 and 23, and enable lubricant to which pressure has been maintained by the accumulator, to pass through the nozzles for application to the conveyor chains 24 and 25.

Typical line pressures vary up to about 75 psi, and typical inside line diameters vary from about one-eighth ($\frac{1}{8}$) inch to about three-quarters ($\frac{3}{4}$) inch. Hence, for a given range of accumulator pressures, line pressures, inside line diameters, cam rotation rate, the latter determining lubricant demand, nozzle flow rate, and conveyor length, a fairly accurate determination can be made of these parameters necessary to deliver the correct amount of lubricant to maintain the conveyor suitably lubricated, without resulting in excessive or insufficient lubrication.

The cam-driven, short period, mechanical, on-off device of this invention is much preferred to a long term, on-off switching regulation by an electrically actuated solenoid system, which can result in either excessive or insufficient lubrication.

We claim:

1. An apparatus for applying lubricant to nozzles for lubrication of conveyors which move food packages thereon, comprising:
   a. an inlet valve and associated valve line for receiving the lubricant from a supply source;
   b. an outlet valve and associated valve line for forwarding lubricant to at least one outlet nozzle;
   c. an accumulator connected to the inlet and outlet valves;
   d. outlet nozzles for receiving lubricant from the accumulator and the outlet valve;
   e. conveyor means for moving articles thereon, the outlet nozzles being adapted to apply the lubricant to the conveyor;
   f. motor means for moving the conveyor;
   g. a rotary actuated device driven from the conveyor, the said device being adapted to open and close the inlet and outlet valves in alternate sequence; whereby:
      i. when the inlet valve is open, the outlet valve is closed, and lubricant will be admitted from the supply source, and its pressure maintained between the inlet and outlet valves;
      ii. when the inlet valve is closed, and the outlet valve is open, lubricant to which pressure has been maintained by the accumulator, will be forced through the outlet valve and into the nozzles, thereby lubricating the conveyor; and,
      iii. the inlet and outlet valves will be actuated, and the conveyor will be lubricated with lubricant from the nozzles only when the said rotary device is being rotated and the conveyor is being consequently moved thereby.

2. The apparatus of claim 1, in which the rotary actuated device is a cam drive actuated from a drive shaft for the conveyor.

3. A method of lubricating a moving conveyor chain for transportation of articles thereon with lubricant applied by a lubricating apparatus, the said apparatus comprising:
   a. an inlet valve and associated valve line for receiving the lubricant from a supply source;
   b. an outlet valve and associated valve line for forwarding lubricant to at least one outlet nozzle;
   c. an accumulator connected to the inlet and outlet valves;
   d. at least one outlet nozzle for receiving lubricant from the accumulator and the outlet valve;
   e. a conveyor chain means for moving articles thereon, the outlet nozzle being adapted to apply the lubricant to the conveyor chain for lubrication purposes;
   f. motor means for moving the conveyor chain, the motor means including a drive shaft;
   g. a cam mounted on the said drive shaft, the cam being shaped to open and close the inlet and outlet valves in alternate sequence; the method comprising:
      i. opening the inlet valve and simultaneously closing the outlet valve, thereby admitting lubricant from the supply source and maintaining pressure on the lubricant between the inlet and outlet valves;
      ii. closing the inlet valve and opening the outlet valve, thereby maintaining the pressure on the lubricant by the accumulator through the outlet valve to the outlet nozzle for lubricating the conveyor chain; and,
      iii. actuating the inlet and outlet valves and lubricating the conveyor chain with lubricant from the nozzle only when the drive shaft and attached cam are being rotated, the conveyor chain being consequently moved thereby.

4. The method of claim 3, in which the lubricant from the supply source is applied at a pressure which varies up to about 75 p.s.i., and the inside diameters of the inlet line and outlet lines vary from about one-eighth ($\frac{1}{8}$) inch to about three-quarter ($\frac{3}{4}$) inch.

5. The method of claim 3, in which the inlet and outlet valves and accumulator are mounted on a support plate.

* * * * *